(12) United States Patent
Vankirk Simmons

(10) Patent No.: US 12,142,914 B2
(45) Date of Patent: Nov. 12, 2024

(54) METHODS AND APPARATUS FOR THE SENSING, COLLECTING, TRANSMISSION, STORAGE, AND DISSEMINATION OF HIGH-RESOLUTION POWER GRID ELECTRICAL MEASUREMENT DATA

(71) Applicant: Neuville Grid Data Management Limited, London (GB)

(72) Inventor: Clarke Vankirk Simmons, London (GB)

(73) Assignee: Neuville Grid Data Management Limited, London (GB)

(*) Notice: Subject to any disclaimer, the term of this patent is extended or adjusted under 35 U.S.C. 154(b) by 784 days.

(21) Appl. No.: 17/057,611

(22) PCT Filed: May 22, 2019

(86) PCT No.: PCT/GB2019/051413
§ 371 (c)(1),
(2) Date: Nov. 20, 2020

(87) PCT Pub. No.: WO2019/224539
PCT Pub. Date: Nov. 28, 2019

(65) Prior Publication Data
US 2021/0203184 A1    Jul. 1, 2021

Related U.S. Application Data

(60) Provisional application No. 62/674,982, filed on May 22, 2018.

(51) Int. Cl.
*H02J 13/00*    (2006.01)

(52) U.S. Cl.
CPC .. *H02J 13/00002* (2020.01); *H02J 13/00028* (2020.01); *H02J 13/00034* (2020.01); *H02J 2300/24* (2020.01); *H02J 2300/28* (2020.01)

(58) Field of Classification Search
CPC .............................. G01R 19/2513; G01R 25/00
See application file for complete search history.

(56) References Cited

U.S. PATENT DOCUMENTS

2016/0239010 A1    8/2016    McDaniel et al.

FOREIGN PATENT DOCUMENTS

| CN | 107255758 A | 10/2017 |
|---|---|---|
| EP | 3098935 A1 | 11/2016 |
| WO | 2019224539 A4 | 11/2019 |

OTHER PUBLICATIONS

Foreign Communication from a Related Counterpart Application, International Search Report and Written Opinion dated Sep. 19, 2019, International Application No. PCT/GB2019/051413 filed on May 22, 2018.

(Continued)

*Primary Examiner* — Lam S Nguyen
(74) *Attorney, Agent, or Firm* — Conley Rose, P.C.; Michael W. Piper; Elexis A. Jones

(57) ABSTRACT

Provided is a sensor network and method for monitoring electric power systems, collecting high-resolution data, and securely feeding it into an advanced time-series database. An apparatus for monitoring a power grid by collecting high-resolution electrical measurement data comprises an operative pair of signal analysers, the operative pair comprising: a micro-synchrophasor configured to operate in the frequency-domain to process an electrical signal and collect a first set of data points; and a power quality monitor configured to operate in the time-domain to process the electrical signal and collect a second set of data points; wherein the apparatus is configured to apply the same synchronised timestamp to the collected first and second sets of data points. A method for monitoring a power grid and collecting high-resolution electrical measurement data comprises the steps of collecting (101) a first set of data points using a (Continued)

micro-synchrophasor operating in the frequency-domain, collecting (102) a second set of data points using a power quality monitor operating in the time-domain, and applying (103) a synchronised timestamp to the collected first and second sets of data points.

16 Claims, 2 Drawing Sheets

(56) References Cited

OTHER PUBLICATIONS

Foreign Communication from a Related Counterpart Application, Examination Report dated Mar. 11, 2020, Great Britain Application No. GB2002162.2.

Kamwa I, et al., "Development of Rule-Based Classifiers for Rapid Stability Assessment of Wide-Area Post-Disturbance Records", IEEE Transactions on Power Systems, IEEE Service Center, Piscataway, NJ, US, vol. 21. No. 1, Feb. 1, 2009, pp. 258-270, XP011241352, ISSN: 0885-8950.

Foreign Communication from a Related Counterpart Application, Chinese Office Action dated May 20, 2024, Chinese Application No. 201980048342.1 filed on May 22, 2019.

METHODS AND APPARATUS FOR THE SENSING, COLLECTING, TRANSMISSION, STORAGE, AND DISSEMINATION OF HIGH-RESOLUTION POWER GRID ELECTRICAL MEASUREMENT DATA

CROSS-REFERENCE TO RELATED APPLICATIONS

The present application is a filing under 35 U.S.C. 371 as the National Stage of International Application No. PCT/GB2019/051413, filed May 22, 2019, entitled "METHODS AND APPARATUS FOR THE SENSING, COLLECTING, TRANSMISSION, STORAGE, AND DISSEMINATION OF HIGH-RESOLUTION POWER GRID ELECTRICAL MEASUREMENT DATA," which claims priority to U.S. Application No. 62/674,982 filed on May 22, 2018 and entitled "METHOD AND APPARATUS FOR THE SENSING, COLLECTING, TRANSMISSION, STORAGE, AND DISSEMINATION OF HIGH-RESOLUTION POWER GRID ELECTRICAL MEASUREMENT DATA," both of which are incorporated herein by reference in their entirety for all purposes.

FIELD OF THE INVENTION

The invention provides methods and apparatus for sensing, collecting, transmission, storage and processing of high-resolution electrical measurement data from a power grid or other electrical apparatus.

BACKGROUND

Electric utility companies face many challenges. There is a continuous need for better ways to: control complex power flows; diagnose problems; provide system operators with better network visibility; enhance equipment performance; improve asset utilization; and plan network improvements.

With today's rapidly evolving power grid, Distribution Network/System Operators (DNO/DSO) face significant technical difficulties including: variable and volatile power flows from distributed energy resources; real and reactive power issues; power quality distortions; poor power factors; phase angle stability; and voltage oscillations. These problems extend to: reducing electrical losses; employing synthetic inertia; electrical disturbances analysis; cyber-security; and equipment condition monitoring.

Electric utilities want to improve: network modelling; real time thermal ratings; charging electric vehicles; load profile sensing; topology and state determination; network congestion; demand side management; and planning/handling of energy storage based services. Power generators (e.g. utility-scale solar photovoltaic and wind farms) have related problems and opportunities for efficiency gains. Large commercial & industrial consumers of electrical power suffer from power quality problems. Energy supply companies and system operators want network demand, active topology, and constraint information. Touching upon many of these issues is reducing carbon emissions through integration of increased wind and solar power generation. Existing Supervisory Control And Data Acquisition (SCADA) systems and legacy instrumentation are simply not up to the task. Existing household-level Advanced Metering Infrastructure (AMI) smart grid meters with their half hourly data points are insufficient. Modern power grids need better sensors and data handling systems.

SUMMARY OF INVENTION

The inventor of the present invention has determined that various innovation opportunities, challenges and problems can be addressed directly or indirectly with the right analytical tools, models, and software application if the right grid or other monitoring data can be supplied. Disclosed below is an innovative sensor network for monitoring electric power systems, collecting high-resolution data, and securely feeding it into an advanced time-series database. In some examples, the time-series database is available as a cloud-storage-based Data-as-a-Service platform, in conjunction with software applications, to provide widely needed solutions to numerous commercial and technical challenges faced by the electric power sector.

The inventor has integrated together several new technologies into an industrial-grade system that combines innovative data-gathering sensor hardware and advanced database software (dataware) connected by secure data communications. When these technologies are brought together, the resulting system has the capability to scrutinize the behaviour of an electric power grid and associated equipment at an improved level of detail, clarity, and sophistication. Existing electric utility grid, load, and power generation monitoring SCADA systems typically draw relatively crude electrical measurements (e.g. voltage, current measurement with an accuracy of ±5-7% for UK Power Networks) from the sensed signal every 2-4 seconds for immediate examination but only retain into data storage one set of measurements every 30 minutes. The result is poor quality data collected on a relatively coarse timescale. The inventor has improved upon existing technologies and arrangements by combining high-accuracy electrical measurements taken at a high sample rate to provide a voluminous stream of high-resolution data into a time-series database, preferably via a secure telemetry. Time-series databases are better suited to such high volume measurements than relational databases. This more efficient and effective apparatus matches the volume (prospectively quadrillions of data-points amounting to petabytes) and rate of data collection with suitable handling and storage capacities. While the hardware and dataware could operate independent of the other together they provide an integrated solution offering superior performance with a reduced amount of equipment required.

Grid Data Unit™ (GDU) sensor boxes from Neuville Grid Data™ uniquely combines newly devised micro-synchrophasors (µPMU) with power quality monitors (PQM) wherein the two devices share a common timestamping method to facilitate effective combination and comparison of collected data points. In some example, the GDU further includes a metal enclosure; ambient environmental condition sensors; sub-100 nanosecond timing; and next-generation secure telemetry via redundant/alternate communications propagation paths. The collected, transmitted, stored and delivered electrical measurement data features 100-100,000× improvement on the state of the art. In the frequency domain, the micro-synchrophasor function provides 0.001 degree phasor angle accuracy giving voltage and current measurements accurate to 2 parts per million (PPM). In the time domain, the power quality function provides an array of high-accuracy measurements according to the IEC 61000-4-30 Ed 3 Class A standard plus supra-harmonics in the 2-150 kHz range. Data-points are time stamped with global navigation satellite system (GNSS), such as GPS, derived timestamp with an accuracy of 50-80 nanoseconds depending on geo-atmospheric conditions relative to the observed GNSS satellite constellation. The invention described features a more effective and efficient arrangement of components within the apparatus in relation to a shared antenna array and environment sensors. The invention also incorporates a multi-core, multi-thread capable, co-processor for local-node, comparative paired-node, mesh-network, fog-computing, or edge-processing data analysis processing. Neuville's GDU hardware design specifically but not exclusively improves upon the GridAnalyzer™ device from Power Standards Lab of Alameda California.

Existing relational databases cannot efficiently handle the quadrillions of data-points amounting to petabytes streaming from a network of Neuville GDUs. A time-series database (TSDB) such as that referred to as the Berkeley Tree Database is therefore incorporated and modified into a novel time-series matrix data-base (TSMDB) to provide a low-cost, highly-scalable, Cloud-based or private server-based solution. The base Berkeley Tree Database offers a 1,400× improvement on existing commercial methods.

Working with electricity network and operating component (e.g. transformers, switchgear, inverters, generators, etc.) plus other data time-stamped in nanoseconds, Neuville's novel hardware and data handling structure permits multi-domain, multi-scale data analysis, enabling unprecedented condition monitoring, operational tuning, prediction and anomaly detection.

BRIEF DESCRIPTION OF THE DRAWINGS

Apparatus and methods are described in detail below, by way of example, with reference to the accompanying drawings in which.

DETAILED DESCRIPTION

Figure 1:
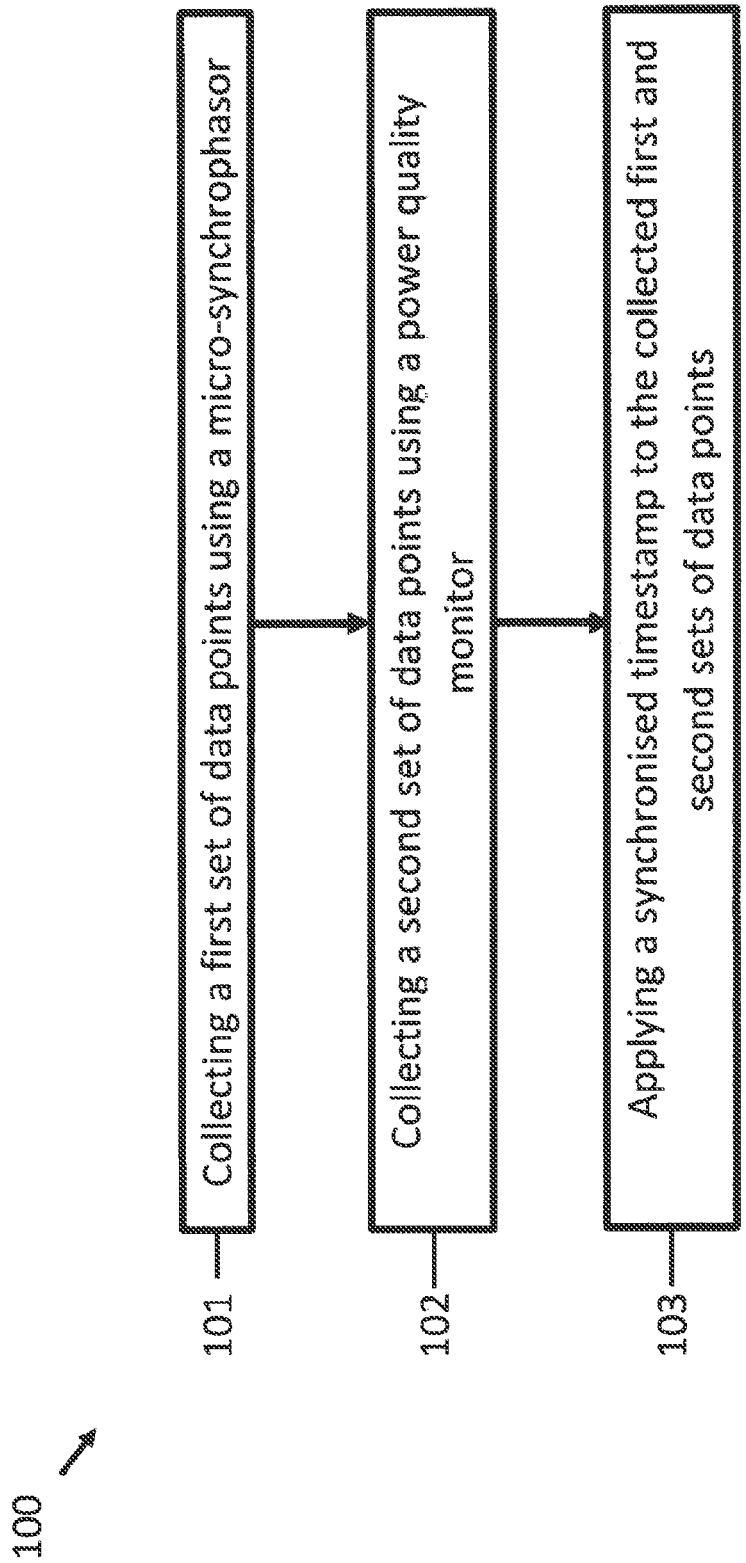
FIG. 1 shows a method for monitoring a power grid and collecting high-resolution electrical measurement data according to an example.

In an example, the apparatus comprises one or more operative-pair comprising a micro-synchrophasor and a power quality monitor. In some examples, the operative pair may further comprise additional signal analyzing devices. In an example, the operative-pair processes an electrical source signal simultaneously in the frequency-domain via the micro-synchrophasor method and in the time-domain using power-quality measurement techniques to collect time-domain data points and frequency domain data points. A congruent timestamp is applied to the collected time-domain data points and frequency-domain data points. In some examples, the timestamp applied to the collected time-domain data points and frequency-domain data points is derived by the same method. In an example, one or more operative-pairs within an apparatus and/or further adjoining apparatus may process different source signals drawn from instrument transformers' secondary outputs or directly sensed.

The operative-pair of signal analysers may comprise two of the same type of physical devices operating in different firmware modes (e.g. the PQube3 (Registered Trademark) device from Power Standards Lab of Alameda California). In some examples, the operative pair of devices may be two different types of signal analysers that may or may not be from the same manufacturer. In some examples, this operative-pairing of two fundamentally different methods of electrical signal processing can be implemented in a single physical device featuring capable sub-functions within its firmware or via further software processing on a separate computation device.

Conventional Phasor Measurement Units (PMU) are electrical measurement devices typically used on high-voltage transmission lines to determine current and voltage phase angles with an accuracy of 1°. Newly devised μPMUs from PSL provide high accuracy (0.003°) phasor angle (δ) measurements of current and voltage every half-cycle. Small, compact and robust, PQube3 μPMUs offer 333× accuracy improvement at roughly 1/10th the cost of a standard PMU. The 333× typical accuracy improvement make μPMUs particularly useful to the much larger market of MV power distribution grids. Alternately the PQube3 device can switch firmware modes and collect power quality measurements (PQM) at 512 samples per cycle (26/31 kHz) including waveforms and 50th order harmonics. This is a 50,000× improvement on existing utility SCADA systems. Under PQM mode, it also supports a 40-channel digital oscilloscope capturing disturbance events at up to 4 MHz; 2,000 parameter triggered meters sampling at 2 Hz; collection of supra-harmonics; and a revenue grade energy meter. All data is GPS time-stamped and the measurements thus synchronized across distant points to sub-100 nanosecond accuracy—a 100,000× refinement of the temporal dimension over existing SNTP based systems. This permits an enlarged and enhanced range of powerful network analysis techniques and cost-saving end-use applications. On-board analysis and reporting tools make even a single pair of μPMU potent electrical instruments. When deployed across a power grid, a networking effect comes into effect. The economic value and technical impact of the μPMU network will grow in a nonlinear exponential fashion according to a lessor variant of Metcalf's law.

Incorporating additional collocated operative-pairs of signal analysers into the apparatus facilitates cost-efficient sharing of a common power supply arrangement, control signals, Global Navigation Satellite System (GNSS) antenna/signal, anti-tamper/anti-theft protections, and/or telemetry arrangements. Sharing the same GNSS (GPS) antenna for example saves: procurement, installation, and maintenance costs; wind-load, weight & space on the antenna array mast; etc. It also provides exactly the same timing signal which ensures chronological unity of measurement (i.e. perfect time alignment). Prior solutions using two adjoining GNSS (GPS) antennas will normally provide slightly different results caused by instrument drift and other subtle differences leading to timestamp divergence.

In some examples, the operative-pair may be implemented with appropriate compensation, as logical or functional pairs over a communications network but physically separated by a noticeable distance between the emplacements of each device forming an operative-pair. Such a capability allows the dynamic compensation for a failed device or adaptive configuration of widely emplaced devices to suit functional objectives or to flexibly meet changing conditions.

In one example illustrated in FIG. 1, a method 200 is provided for monitoring a power grid and collecting high-resolution electrical measurement data comprising: collecting 101 a first set of data points using a micro-synchrophasor operating in the frequency-domain; collecting 102 a second set of data points using a power quality monitor operating in the time-domain; and applying 103 a synchronised timestamp to the collected first and second sets of data points.

The examination and processing of the same electrical signal by two difference means (frequency domain synchrophasor and time domain power quality) facilitates the use of two different classes of analytical techniques. The combination of the two processed signals facilitates the use of a broader range of established methods, new or novel techniques, and as yet un-devised analytical methods.

The provision of a time synched array of multiple measurements derived from two fundamentally different approaches creates analytical opportunities for further development and exploitation. An analytical example being to derive the presumably same or similar frequency, voltage, and measurement values via both methods and check for reasonable agreement or deviation of the results within a statistical tolerance. A simple lack of agreement or divergence/cycling over time in agreement being indicative of an anomaly worthy of further examination or correction.

In an example, the operative-pairs of devices are functionally combined into a single unitary device. This placement and integration may use integrated circuits and other components onto a single circuit board or reduced number of circuit boards featuring shared, but not limited to: power supply, memory storage, telemetry modem, input/output connectors, protection features (e.g. fuses) plus environmental, anti-tamper, or self-condition monitoring sensors (e.g. relative humidity and temperature to detect condensing moisture within the enclosure and over-temperature operating conditions). Such a unitary design could be configured with an appropriate connector(s) for slotted rack configuration and/or easy replacement. In some examples, the apparatus may include additional signal processing devices such as an oscilloscope, and these devices may be directly connected or remotely operated to facilitate the wired or wireless monitoring of measured signals. Such additional devices may be attached via a connector or coupler that passes through the exterior of the enclosure to integral electrical leads and probes pre-installed in the enclosure. Such device can be provided with electrical power from the GDU's power supply via a socket or plug that also passes through the enclosure wall. Such connectors and plugs may be protected with caps and or a hinged cover when not in use. Implementing the probes and connection leads within the apparatus removes the need to compromise the integrity of the device when additional signal processing functionality (e.g. an oscilloscope) is required, as there is no need to make new connections through the enclosure.

In an example, the operative-pair may perform the functions of an energy meter based upon calculations via either its power quality or micro-synchrophasor measurement capabilities. In some examples, both the power quality monitor and the micro-synchrophasor measurements are compared to check for reasonable agreement to give further assurance the reported amount of energy generated, transmitted, delivered or consumed is correct and accurate to within a given statistical tolerance of accuracy. It also provides redundancy and diversity in the event one device or method fails or becomes unavailable.

In some examples, the apparatus may also contain a shared power supply, data storage, and telemetry (modem) equipment. In an example, each operative pair has its own separate and not shared power supply, data storage and telemetry equipment. An enclosure box comprising the apparatus may be arranged with single power supply arrangement that supports multiple operative-pairs. An enclosure comprising the apparatus may be arranged with single telemetry and antennas array arrangement that supports multiple operative-pairs. Where equipment is shared, cost savings and simplicity of design results. In some examples, redundancy and diversity of systems will be implemented for avoidance of single points of failure in the system architecture.

In some examples, conductive or transduced signals from AC electrical signal sensors such as current transformers, voltage transformers or other instrument transformers are wired to the operative-pairs of signal analyzing devices. DC current sensors such as Hall Effect devices may also be attached. Such sensor signals may be shared by both halves of an operative-pair or separately derived for each device in an operative-pair.

In some examples, ambient environmental sensors may be attached to one or more of the operative-pairs. Such sensors measuring interior to the enclosure and/or exterior (outdoor) temperature, relative humidity, barometric pressure, precipitation, vibration and or seismic activity. Additional sensors may determine wind speed and air turbulence (e.g. rotating cup or ultrasonic type anemometer, LIDAR, etc.) near the ground or aloft. Further sensors may determine solar irradiance across various spectral bands (IR, visible, and or UV). Further connected sensors may determine various properties of air quality such as aerosol content, particulates, or gaseous species content. Additional detectors and sensors may be attached to monitor radiation (e.g. Geiger counter type device) or cosmic rays (e.g. a muon detector.) Further sensors may involve ultrasonic, laser-based or electromagnetic radar emitters, receivers or transceivers. In some examples, the environmental sensors are connected to the data recording with timestamp capability of the GDU.

In some examples, acoustic sensors attached to or otherwise positioned to listen to monitored equipment (e.g. transformers, inverters, motors, rotating machinery, etc.). In an example, the acoustic sensors are connected to the data recording with timestamp capability of the GDU.

In an example, the apparatus components are connected to one or more antenna and may include signal processing/converters for more than one global navigation satellite system (GNSS), e.g. the American Global Positioning System known as GPS. The GNSS antenna receiving high-precision locational and timing information. Available GNSS include but are not limited to: American Global Positioning System known as GPS; Russian Global Navigation Satellite System called GLONASS; China's BeiDou Navigation Satellite System; the European Union's Galileo system; India's NAVIC; and Japan's Quasi-Zenith Satellite System. Alternate timing and locational information could come from other radio-navigation systems or a clock internal to the enclosure of sufficient stability, precision and synchronization. In some examples, multiple GNSS inputs are used to provide redundancy and diversity of systems. Continuous monitoring of mutual agreement between the multiple GNSS inputs supports detection of divergence or other discrepancy indicative of an anomaly, problem, failure, malicious tampering, or cyber-attack on one or more GNSS either globally or with local/targeted effects.

In some examples, mounted on one or more elevated masts is an array of antennas associated with GDU operative-pair functions such as telemetry communications and the obtaining of GNSS timing and locational data. In some examples, this includes one or more of each of the following types: GNSS (e.g. a modified GPS antenna able to obtain high-precision timing signals); omni-gain and directional cellular (e.g. 2/3/4/5G), satellite (e.g. Imarsat or low-earth orbit (LEO) constellation); directional microwave communications link; omni and or directional (e.g. yagi type) radio-frequency (RF); directional light-wave carrier; etc. In an example the antenna array is provided with protective lighting arrestors and an enclosing protective shroud that is transparent to the relevant spectra (e.g. shroud made of a plastic (e.g. polypropylene, ABS or PVC) or fiber reinforced plastic (GRP fiberglas) composite). The protective shroud protects the antenna array components from environmental degradation and deters theft. Any powered masthead devices (e.g. transceivers, emitters and receivers) can be provided electrical power via either mains-supply or by one or more power-over-ethernet (PoE power supply) electrical supply connections alongside network cabling connections. Environmental sensor mountings for irradiance, wind, temperature, humidity, precipitation, barometric pressure may be provided. The environmental sensors in some examples form a unitized sub-assembly. The antenna mast and array can also provide a vantage point for mounting one or more security cameras or other security surveillance sensors. In some examples, the mast accommodates a pico-cellular communications transceiver, other telemetry-capable antennas, and/or Wi-Fi, WiMAX, LoRa and other LAN antennas. In some examples, mast-head omni-directional antennas and one or more directional antenna(s) are geographically oriented toward nearby communications relay/downlink tower(s) or other correspondent transceiver antennas with the strongest signal or preferred telecommunications provider.

In an example, the enclosure of the apparatus is made of metal or having a conductive coating or similar material property create a Faraday cage around the apparatus to exclude radio-frequency interference (RFI), electro-magnetic interference (EMI) or similar radiated or conducted emissions (particularly those associated with alternating power circuits with a grid frequency of 50/60/400 Hz) from entering the enclosure and hampering or otherwise interfering with the proper operation of the equipment contained within. Wires or other conductive pathways into the enclosure may be protected by appropriately conductive glands/grommets and encircling ferrite beads or other effective means. By making the enclosure out of metal or other material with high thermal conductivity, internally generated heat can be more readily dissipated via radiance and convection. Retained heat build-up and resulting excessive interior temperatures within the enclosure can hamper proper GDU operation and degrade components such as capacitors leading to faulty operation, stoppage or shortened service life. In some examples, the enclosure is made of steel or aluminum. Metal enclosures are durable; generally having longer service lives from being more resistant to degradation from ultra-violet light and other ill-effects. Metal enclosures also feature a much higher degree of fire protection than plastic ones. The metal enclosure also has a high degree of physical intrusion protection against dust, water and probing tools or fingers. Existing methods of enclosing micro-synchrophasors make use of polycarbonate plastic boxes which can be less expensive and easier to modify but are susceptible to EMI/RFI problems and heat build-up.

In an example, the apparatus has an enclosure having a removable lid or cover that may be hinged. In some examples, the enclosure has an integral locking device or hasp lock. In some examples the enclosures have mechanisms that detect, record and alert by data transmission a central operations centre when the enclosure is opened, moved or tampered with. For cabinets, enclosures or other structures containing electrical devices like micro-synchrophasors and power quality monitors or other equipment—anti-tamper security features like photo-cell and environmental sensor (temp, RH, barometric pressure, tilt, vibration) that detect the opening of the enclosure, its molestation, and or movement. Triggers may be internally mounted to the enclosure or integrated onto a circuit board in such a position that a camera that images a scene out of the opening—presumably taking an image of the person or persons who opened the cabinet. Learning software able to detected departure from normal patterns and send alert by one or more means of data communication plus making of an annotation in recorded data files is implemented in some examples. In an example, this system includes the performing of physical intrusion detection of the enclosure: opening, GPS location movement, abrupt change of enclosure's internal temperature or humidity conditions, photocell detection of enclosure opening, tilt/jarring, etc.

In some examples, the apparatus utilizes distributed mesh fog hive data processing, where each node of operative-pairs is able to independently process data locally and/or cooperatively in conjunction with other GDU nodes and optionally other data stores. Such a system facilitates the sharing between topologically neighboring nodes of analytical processing tasks or results, such as local state determination. Co-processor with a single or multiple processors featuring single or multiple: computational cores, graphics processing units (GPU), float-point processing units (FPU) can be used. Such co-processor(s) may or may not be capable of multi-thread processing. Such a meshed, edge-processing or fog computing capability can perform a variety of processing and analytical functions related to GDU gathered grid data, equipment condition monitoring inputs, or on other information to serve non-electrical purposes needing computational capacity.

In known time-series matrix databases (TSBD), each recorded value (scientific measurement, financial trading quantity, etc.) is paired with timestamp or timing mark from an epoch starting reference into "tuple" consisting of the measured value or assigned value paired with a temporal or chronological value. Neuville improves upon this data-array architecture by incorporating multiple measured values matched to a single timestamp in single row of entries; not a tuple but a multi-tuple. As part of the larger Neuville apparatus, this ensures the aligned recording (qualitative assurance) of multiple simultaneous measurements (e.g. voltage, amperage, and frequency) from a single or multiple electrical source signal(s) with a unifying and harmonized timestamp. Thus, forming a time-series matrix database (TSMDB) data structure that is more storage space efficient, faster, and more suitable to handling and analytical processing of time aligned measurements or quantified values or condition states (e.g. switch position).

Figure 2:
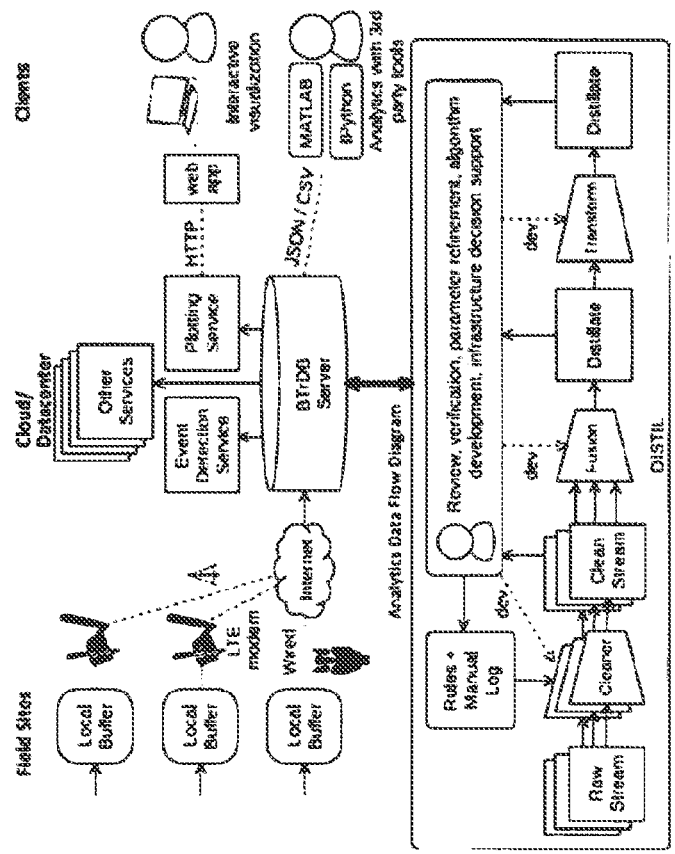
FIG. 2 illustrates a Berkeley Tree Database system architecture according to an example.

As shown in FIG. 2, the TSDB system may be built upon the Berkeley Tree Database BTrDB 200 to provide the following features:
- Uniquely it runs 1,400× faster than the best commercially available solution for handling time-series data;
- Can collect and store multiple concurrent high-bandwidth, unordered data streams
- Achieves 2.9 compression ratio with a demonstrated throughput of 53 million inserts and 119 million queries per second.
- Can handle 1,000 µPMU sensor nodes with a single server;
- Can locate a handful of voltage sags among 3.4 billion data points in under 200 ms;
- Easily implemented on easily scaled, standard Amazon web servers
- Plus adaptable to deftly handling electrical, financial, IoT, process, environmental, and many other types of time-marked data.

For electric grid data, this novel TSDB structure permits multiscale data analysis, enabling prediction and anomaly detection across the range of voltage, current, and time scales that affect transmission & distribution grid performance.

Hyper-efficient data-engine requires less than 5,000 lines of code. Neuville is commercializing it with an Application Programming Interface (API), secure telemetry linkages, revenue mechanisms, access controls, and other proprietary enhancements.

Most TSDBs are limited to millisecond precision and are therefore unsuited to synchrophasor data. Most are also not well suited to the enormous amounts (petabytes holding quadrillions of datapoints) of electrical grid data Neuville intends to handle. BTrDB provides a solution to both of these significant challenges.

In some examples, the apparatus comprises an integrated system consisting of electrical sensors, operative-pairs of signal analyzers in enclosures, APN plus VPN secured telemetry, a time series database that ingests, stores and retrieves collected time-series data.

The time-series data-base implemented in the system may feature an application programming interface (API) that facilitates interaction with third-party software, systems and hardware devices; revenue gathering and recording software and database mechanisms; access security; and generally supporting Data-as-a-Service method of disseminating grid data collected and stored. The telemetry package provides secure, confident transmission of power system measurements.

Software and related communications plus data-structures and security features permits the remote or local configuration and management of the GDU signal processing functions and device operative-pairs, plus data-storage handling, security functions, self-conditional monitoring, and telemetry. In some examples, the software and related features are able to monitor and manage a fleet of equipment across a wide geography, and in an example, watches for and provides alerts to any tampering detected with operative-pair configuration, firmware, stored data, data-storage mechanisms, analytical results, control functions, messaging, security functions, enclosure, antenna array, and/or telemetry settings.

The operative-pairs of micro-synchrophasors and power quality monitors may adhere to and perform firmware functions/data formatting in conformance with IEC or other technical standards. This makes possible technical interoperability among other open-standard adhering software, firmware, systems and hardware.

In an example, the apparatus is attached to a three-phase circuit for monitoring purposes but it can also work with single phase, dual phase or just two-phases of three phase system. The established means of attachment may be the emplacement of current and voltage instrument transformers such that they sense the target current and provide a proportionate signal via their secondary outputs. Revenue grade induction type instrument transformers are best but Rogowski coil and other types can be used in certain instances. Protection grade instrument transformers can also be utilized with somewhat reduced performance. For low voltage situations direct sensing of voltage can be applied. For medium and high-voltage applications, an intermediate instrument transformer is emplaced or in the case of existing installation adapted such that instrument transformers' secondary output leads carrying the proportionate signal (typically 120 v and 5 Å) are sensed by GDU connected high-precision current transformers and voltage inputs to the operative-pairs. Such high-precision current transformers being of either aperture or split-core type. The GDU includes a suitable supply of electric power and internet broadband access.

Unlike known systems containing micro-synchrophasors, to make the apparatus suitable and safe for installation and operation in a utility substation, electrical generation plant, or other electrical facility the device incorporates one or more of the following with or without redundancy:

Isolation switch or switches that de-energize the system and disconnect it from external signal, data, and telemetry connections to include a switching arrangement that isolates both AC and DC power supplies;

Type-1 surge protection device plus a type-surge protection device (SPD) type or a combined a type-1+2 surge protection device type;

Residual current device (RCD) type electrical protection;

Singular or redundant switching power supply(s) of sufficient capacity and durability that convert incoming AC mains or parasitically obtained power into suitable voltage DC power;

Buffering short-duration capacitor type uninterruptable power supply;

Longer-duration battery type uninterruptible power supply (UPS) with battery management module; and/or An arrangement whereby the incoming mains power and the resulting DC power are both conditioned monitored by an operative-pair.

The above disclosed apparatus may be implemented on an energy generation plant to provide highly accurate information on the state of the generating equipment and power network. Such information can be used to make operational decisions to maximise utilization of the energy generation plant. In some examples, the disclosed apparatus is used to optimise the utilization of solar or wind farms.

The invention claimed is:

1. An apparatus for monitoring a power grid by collecting high-resolution electrical measurement data, comprising:
    an operative pair of signal analysers configured to process an electrical signal, the operative pair comprising:
        a micro-synchrophasor measurement unit configured to operate in the frequency-domain to process the electrical signal and collect a first set of data points; and
        a power quality monitor configured to operate in the time-domain to process the electrical signal and collect a second set of data points,
    wherein the apparatus is configured to apply the same synchronised timestamp to the collected first and second sets of data points to provide a time synched array of the data points.

2. The apparatus of claim 1, wherein the apparatus uses a signal from a shared antenna to obtain the synchronised timestamp to apply to the collected first and second sets of data points.

3. The apparatus of claim 1, wherein the apparatus is configured to store the timestamped first and second data points in a time-series database.

4. The apparatus of claim 3, wherein the apparatus is configured to use the time-series database to modify operations on an electricity network.

5. The apparatus of claim 4, wherein the electricity network includes at least one of: solar photovoltaic farm or a wind farm.

6. The apparatus of claim 1, wherein the apparatus includes multiple operative pairs of signal analysers.

7. The apparatus of claim 6, wherein the multiple operative pairs of signal analysers are configured such that they receive electrical signals from different locations on an electricity network.

8. The apparatus of claim 1, wherein the apparatus is configured to measure a divergence between the first and second timestamped data points.

9. The apparatus of claim 1, wherein the apparatus is situated within an electrically conductive enclosure.

10. The apparatus of claim 9, wherein the apparatus comprises one or more electrical sensing probes within the enclosure, the probes having electrical connections to a coupling interface on the exterior surface of the enclosure for the attachment of an external signal processing device.

11. The apparatus of claim 1, wherein the apparatus comprises one or more environmental sensors to collect one or more sets of environment data, wherein the apparatus is configured to also apply the synchronised timestamp to the one or more sets of environment data.

12. The apparatus of claim 1, wherein multiple types of global navigation satellite system inputs are used to apply synchronised timestamps to all sets of data points.

13. The apparatus of claim 1, wherein the apparatus further comprises an isolation switch.

14. The apparatus of claim 1, wherein the apparatus is configured to process a single, dual, or three phase signal, or just two phases of a three phase signal.

15. A method for monitoring a power grid and collecting high-resolution electrical measurement data comprising:
    processing an electrical signal;
    collecting a first set of data points using a micro-synchrophasor measurement unit operating in the frequency-domain;
    collecting a second set of data points using a power quality monitor operating in the time-domain; and
    applying a synchronised timestamp to the collected first and second sets of data points to provide a time synched array of the data points.

16. The method of claim 15, wherein the processing is of a single, dual or three phase signal, or just two phases of a three phase signal.

* * * * *